UNITED STATES PATENT OFFICE.

GEORGE HAND SMITH, OF ROCHESTER, NEW YORK.

IMPROVED PROCESS OF MAKING STEEL DIRECT FROM THE ORE.

Specification forming part of Letters Patent No. 11,338, dated July 18, 1854; Reissue No. 2,333, dated August 14, 1866.

DIVISION No. 1.

*To all whom it may concern:*

Be it known that I, GEORGE HAND SMITH, of Rochester, in the State of New York, have invented a new and useful Process for Making Steel Direct from the Ore; and I do hereby declare that the following is a full, clear, and exact description thereof.

My invention relates to a process for deoxidizing and carbonizing iron ores, and producing therefrom that quality of steel generally known in commerce as "spring-steel;" and my said invention consists in treating the ore in a comminuted state, and mixed with charcoal or other equivalent carbonaceous matter, and with or without other flux, depending on the nature of the ore, in a close cementing oven, muffle, retort, or other equivalent close vessel, at a high degree of heat, to deoxidize it and carbonize the metallic particles, and then balling and welding the metallic particles in a reheating-furnace, and finally rolling, hammering, or squeezing the balls to express the impurities, complete the welding, and compact the metal; and my invention also consists in charging the comminuted ore and the charcoal or other carbonaceous substance in the cementing-oven in alternate layers, so that after the converting process has been completed the converted ore can be readily separated from the carbonaceous matter to be subjected to the after parts of the process without having particles of carbon in admixture, the presence of which would be injurious.

By any of the known and suitable means the ore is crushed or otherwise reduced to lumps of about the size of forty to the inch (more or less) and then mechanically separated from the earthy and other impurities. Thus prepared, the ore with charcoal or other equivalent carbonaceous matter is charged in any suitable cementing-oven—such, for instance, as is generally used in making blistered steel; or it may be charged in a retort, or a muffle, or equivalent vessel in which it can be properly heated. The ore and charcoal, or other equivalent carbonaceous matter, are charged in alternate layers of about one inch and a half in thickness, (more or less,) and when the ore is of such a composition as to require it other flux should be mixed with the ore. The charge so prepared is then to be heated to what is termed a "white" heat, and continued at that heat until the ore shall have been reduced to the metallic state and properly carbonized or converted. For a low grade of steel it will take about forty-eight hours from the time the carbon begins to unite with the iron; but a longer time will be required for higher grades of steel. With a cementing-oven well constructed, and with a fire well managed, the whole process of conversion from the first starting of the fire may be completed in six days, the greatest proportion of the time being consumed in heating the oven and bringing up the charge to the required white heat or welding heat, which is below that of fluidity, as the object is to avoid melting the particles of metal or the complete fusion of the mass during the process of conversion.

The mode of testing the degree of carbonization is by the color of the surface of the ore. When properly charged with carbon for steel of a moderate grade of temper the ore in cooling will assume a blue and yellow color and combinations of these somewhat resembling a brown; but if charged for a grade of high temper it will assume a gray color. By taking out portions of the ore the operator can tell by the colors when the required degree of temper has been reached.

During the converting process the particles of metal become united into a sheet by partial welding and by the earthy impurities present in the ore, and by the flux, if any be used, and as the ore and carbon are charged in alternate layers, this partial union of the particles prevents the particles of coal from getting into the layers of ore and becoming mixed with them, so that after the converting process has been completed the converted ore can be removed separately from the coal, the presence of which would be a source of serious difficulty in the after part of the process.

When cooled and taken out of the oven the mass is to be broken or crushed, and, if desired, the metallic particles separated from the impurities by any of the known means for effecting such separation, and charged in a reheating-furnace, and there heated to a welding heat balled, as in balling scrap-iron, taking care to so manage the fire and the blast that as little free atmospheric air as possible shall pass over into the working-chamber, except when, by accident or inattention of the operatives during the converting process the metallic particles have been overcharged with carbon. In such cases the excess of carbon can be extracted in the balling process by the admission of free atmospheric air. As soon as the particles have been heated to a welding heat and balled they are taken out and hammered, squeezed, or rolled into bars by any of the known means used for that purpose in the manufacture of iron.

It is not deemed necessary to describe or name the various kinds of flux which may be used in addition to the carbon in the convert ing process, as the necessity for and the kind to be used will depend upon the constituents of the ore to be treated, and the properties other than the temper required to be imparted to the steel, as all these are known to iron-masters and are foreign to my invention, which relates simply to the process of converting iron ore directly into steel.

What I claim as my invention, and desire to secure by Letters Patent, is—

1. The process, substantially as herein described, for converting iron ores directly into steel by subjecting the ore in the comminuted state, in connection with carbon, and with or without other flux, in a close oven, retort, or equivalent vessel, to a high degree of heat, and when converted treating it in a reheating-furnace to weld and ball the particles, and then hammering, rolling, or squeezing the balls to express the impurities and complete the welding and compact the mass, as set forth.

2. In the process of conversion, charging the comminuted ore and charcoal or other carbonaceous substance in the cementing-oven, or other equivalent vessel, in alternate layers, substantially as and for the purpose specified.

GEORGE HAND SMITH.

Witnesses:
WM. H. BISHOP,
ANDREW DE LACY.